(12) United States Patent
Dantes et al.

(10) Patent No.: US 6,739,525 B2
(45) Date of Patent: May 25, 2004

(54) FUEL INJECTION VALVE

(75) Inventors: Guenter Dantes, Eberdingen (DE); Detlef Nowak, Untergruppenbach (DE); Joerg Heyse, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/148,942

(22) PCT Filed: Oct. 6, 2001

(86) PCT No.: PCT/DE01/03838

§ 371 (c)(1),
(2), (4) Date: Sep. 30, 2002

(87) PCT Pub. No.: WO02/29242

PCT Pub. Date: Apr. 11, 2002

(65) Prior Publication Data

US 2003/0106946 A1 Jun. 12, 2003

(51) Int. Cl.⁷ .................. F02M 61/00; F02M 61/10; B05B 1/30
(52) U.S. Cl. .............. 239/533.12; 239/533.2; 239/533.3; 239/533.11; 239/585.1
(58) Field of Search ............ 239/533.2, 533.3, 239/533.11, 533.12, 585.1

(56) References Cited

U.S. PATENT DOCUMENTS

| 4,651,931 | A | * | 3/1987 | Hans et al. ............ 239/533.12 |
|---|---|---|---|---|
| 4,971,254 | A | | 11/1990 | Wieczorek et al. |
| 5,170,945 | A | | 12/1992 | Daly et al. |
| 5,875,972 | A | | 3/1999 | Ren et al. |
| 5,915,352 | A | * | 6/1999 | Okamoto et al. .... 239/DIG. 19 |
| 5,979,801 | A | * | 11/1999 | Munezane et al. ...... 239/533.12 |
| 6,027,050 | A | | 2/2000 | Preussner et al. |
| 6,095,113 | A | * | 8/2000 | Nogi et al. ............ 239/533.12 |
| 6,186,421 | B1 | * | 2/2001 | Wahba et al. ............ 239/585.1 |

FOREIGN PATENT DOCUMENTS

| DE | 196 25 059 | 2/2000 |
|---|---|---|
| EP | 0 296 628 | 12/1988 |
| EP | 1 118 767 | 7/2001 |
| GB | 2 050 504 | 1/1981 |

* cited by examiner

*Primary Examiner*—Robin O. Evans
(74) *Attorney, Agent, or Firm*—Kenyon & Kenyon

(57) ABSTRACT

A fuel injector, in particular for direct injection of fuel into a combustion chamber of an internal combustion engine, having an actuator for actuating a valve needle, the valve needle having on one injection end a valve-closure member which forms a sealing seat together with a valve-seat surface formed on a valve-seat member. Fuel channels are provided in a valve needle guide which is designed in one piece with or is connected to the valve-seat member and they open into a swirl chamber. The number of fuel channels is such that a turbulent flow produced in the swirl chamber is homogeneous in a circumferential direction.

8 Claims, 4 Drawing Sheets

FUEL INJECTION VALVE

FIELD OF THE INVENTION

The present invention relates to a fuel injector.

BACKGROUND INFORMATION

German Published Patent Application No. 196 25 059 describes a fuel injector having multiple fuel channels in a flow path of the fuel from a fuel inlet to an injection orifice, the cross section of the channels determining the amount of fuel injected per unit of time at a given fuel pressure. To influence the fuel distribution in a fuel cloud injected, at least some of the fuel channels are oriented so that the streams of fuel coming out of them are injected directly through the injection orifice.

One disadvantage of the fuel injector known from the publication cited above is in particular the fact that the fuel channels are situated in a plane perpendicular to the direction of flow of the fuel, i.e., the orifices are situated on a circle around a valve needle guide connected to the valve-seat member. In this way, the quantity of fuel flowing through the fuel injector is not metered accurately enough when the valve-closure member is lifted up from the sealing seat.

Furthermore, the number of bores is not sufficient to produce a sufficiently homogenous fuel cloud which meets stoichiometric requirements for complete combustion. This is further reinforced by the large diameter of the fuel channels.

SUMMARY OF THE INVENTION

The fuel injector according to the present invention has the advantage over the related art that a turbulent flow created by the fuel flowing through the fuel channels into the swirl chamber remains homogenous in the circumferential direction without any compensatory measures, the volume of the swirl chamber being so small that it is possible to maintain the turbulent flow even during the dead time of the fuel injector.

It is advantageous in particular that the large number of fuel channels ensures a very homogeneous cloud of mixture.

The fuel channels are advantageously formed in a hollow cylindrical valve needle guide which is either designed in one piece with the valve-seat member or is connected to it so that eccentricity and tilting of the valve needle are prevented.

The design of the fuel channels in an annular insert which is insertable into the valve-seat member is especially simple to manufacture and may be used for any desired designs of fuel injectors, because the valve-seat member need only have a cylindrical recess to accommodate the insert.

The shape of the swirl chamber, which is designed as a recess on the injection side of the insert, is also advantageous. Any desired volume may be obtained by appropriate lathing or similar machining and adapted to requirements.

DETAILED DESCRIPTION

Figure 1:
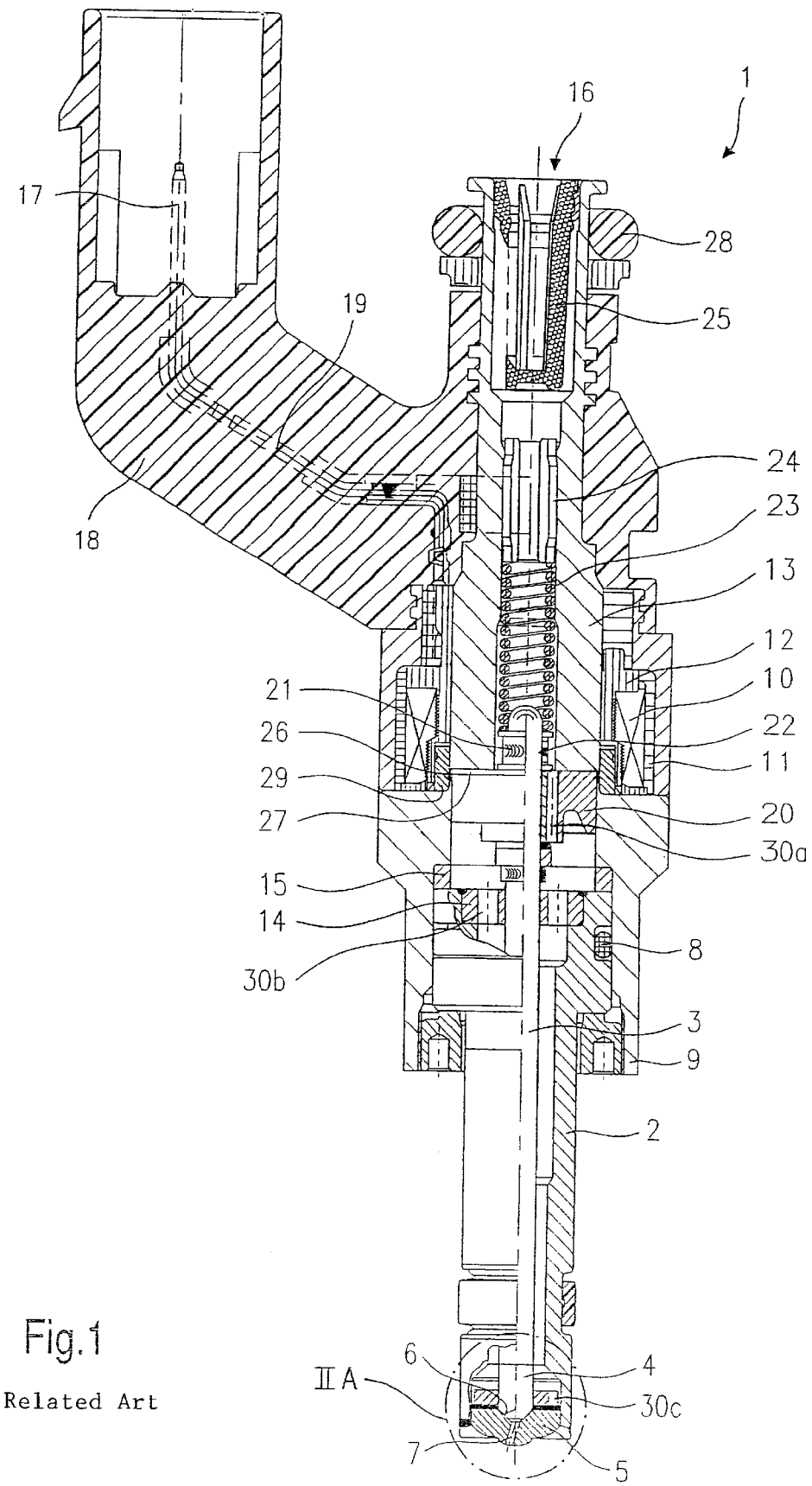
FIG. 1 shows a schematic section through an embodiment of a fuel injector according to the related art.

Before describing embodiments of a fuel injector 1 according to the present invention in greater detail on the basis of FIGS. 2 through 4, a known fuel injector 1 of the same design will first be explained briefly with respect to its advantageous components on the basis of FIG. 1, except for the measures according to the present invention for these embodiments, to permit a better understanding of the present invention.

Fuel injector 1 is designed in the form of a fuel injector for fuel injection systems of internal combustion engines having compression of a fuel mixture and spark ignition. Fuel injector 1 is suitable in particular for direct injection of fuel into a combustion chamber (not shown) of an engine.

Fuel injector 1 has a nozzle body 2 in which a valve needle 3 is situated. Valve needle 3 is mechanically linked to a valve-closure member 4 which cooperates with a valve-seat surface 6 situated on a valve-seat member 5 to form a sealing seat. Fuel injector 1 in this embodiment is an inwardly opening fuel injector 1 having an injection orifice 7. Nozzle body 2 is sealed with respect to stationary pole 9 of a solenoid 10 using a gasket 8. Solenoid 10 is encapsulated in a coil casing 11 and wound onto a field frame 12 which is in contact with an internal pole 13 of solenoid 10. Internal pole 13 and stationary pole 9 are separated by a gap 26 and are supported on a connecting part 29. Solenoid 10 is energized by an electric current supplied via an electric plug contact 17 over a line 19. Plug contact 17 is surrounded by plastic sheathing 18 which may be integrally extruded onto internal pole 13.

Valve needle 3 is guided in a valve needle guide 14 designed in the shape of a disk. A matching adjustment disk 15 is used to adjust the lift. An armature 20 is situated on the other side of adjustment disk 15. The armature is connected in a friction-locked manner to valve needle 3, which is in turn connected by a weld 22 to first flange 21. A restoring spring 23, which in the present design of fuel injector 1 is prestressed by a sleeve 24, is supported on first flange 21.

A second flange 31 which is connected to valve needle 3 by a weld 33 functions as a lower armature stop. An elastic intermediate ring 32 which sits on second flange 31 prevents rebound when fuel injector 1 closes.

Fuel channels 30a to 30c, which carry the fuel supplied through a central fuel feed 16 and filtered through a filter element 25 to injection orifice 7, run in a valve needle guide 14, in armature 20 and on valve-seat member 5. Fuel injector 1 is sealed by a gasket 28 with respect to a fuel line (not shown here).

In the resting state of fuel injector 1, armature 20 is acted upon by restoring spring 23 against its direction of lift, so that valve-closure member 4 is held in sealing contact on valve seat 6. When solenoid 10 is energized, it creates a magnetic field which moves armature 20 in the direction against the elastic force of restoring spring 23, the lift being predetermined by a working gap 27 in the resting position between internal pole 12 and armature 20. Armature 20 also entrains flange 21, which is welded to valve needle 3, in the direction of lift. Valve-closure member 4, which is mechanically linked to valve needle 3, is lifted up from valve-seat surface 6 and the fuel directed at injection orifice 7 through fuel channels 30a through 30c is injected.

When the coil current is disconnected, armature 20 drops away from internal pole 13 due to the pressure of restoring spring 23 after the magnetic field has been reduced sufficiently, so that flange 21, which is mechanically linked to valve needle 3, moves against the direction of lift. Valve needle 3 is therefore moved in the same direction, so that valve-closure member 4 comes to rest against valve-seat surface 6 and fuel injector 1 is closed.

Figure 2A:
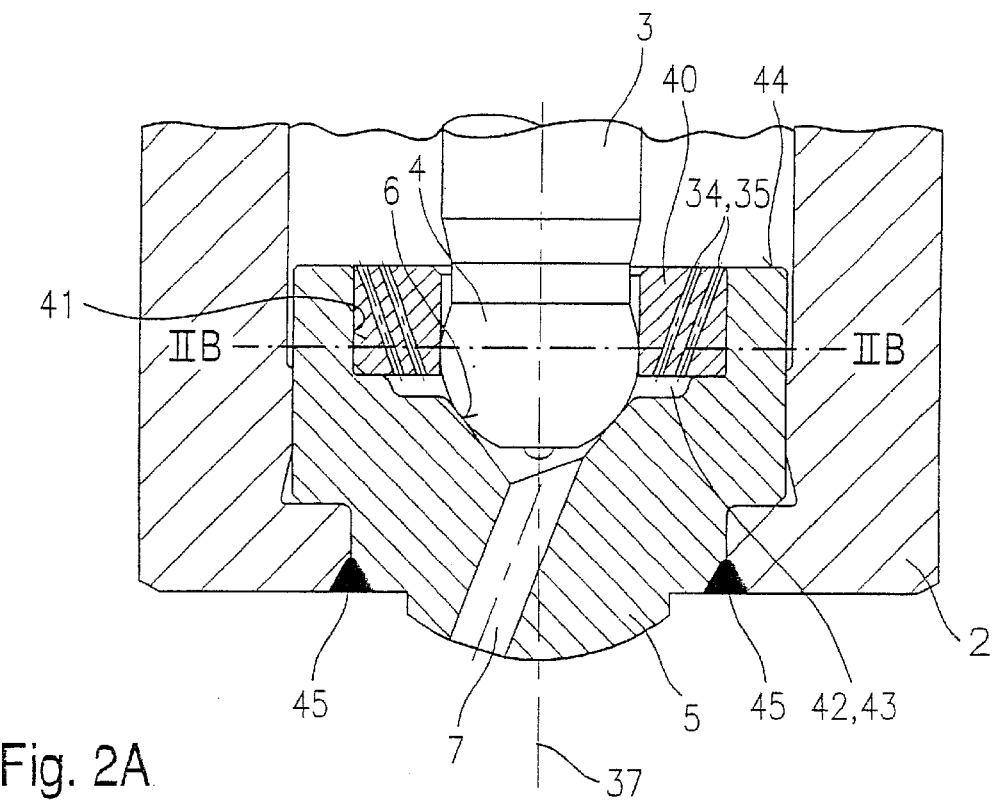
FIG. 2A shows a schematic section through a first embodiment of a fuel injector according to the present invention in area IIA in FIG. 1.

In a detail of a sectional diagram, FIG. 2A illustrates a first embodiment of a fuel injector 1 according to the present invention. The detail shown here is labeled as IIA in FIG. 1.

The part of fuel injector 1 on the injection side, illustrated in FIG. 2A, has nozzle body 2 with valve-seat member 5 inserted into it. At least one injection orifice 7 is formed in valve-seat member 5. Valve-seat member 5 is connected to nozzle body 2 by a weld 45.

Valve-seat member 5 has a first annular recess 41 into which an annular insert 40 is inserted. Fuel channels 35 are formed in annular insert 40. In the present first embodiment, fuel channels 45 are arranged in two rows 34 forming concentric rings. Fuel channels 35 may be arranged in succession radially or with a mutual circumferential offset.

At the outflow end of first annular recess 41, there is a second annular recess 42 forming a swirl chamber 43. Fuel channels 35 in annular insert 40 open into swirl chamber 43. They thus extend from an inlet end face of valve-seat member 5 in which first annular recess 1 is formed to swirl chamber 43.

To obtain the required accuracy in metering fuel, fuel channels 35 should have a very small diameter, e.g., less than 100 $\mu$m, in particular 70 $\mu$m. Such small-caliber bores may be produced by laser machining, for example.

Fuel channels 35 are inclined at an angle α in the injection direction with respect to a plane running parallel to inlet end face 44 of valve-seat member 5. Angle of inclination a may be achieved, for example, by an appropriate adjustment of the axial diameter of annular insert 40. To impart turbulence to fuel flowing through fuel channel 35, fuel channels 35 have a tangential component relative to center axis 37 of fuel injector 1. After flowing through fuel channels 35, fuel collects in swirl chamber 43, producing a turbulent flow in a circumferential direction. The greater the number of fuel channels 35 provided, the more homogeneous may be the turbulent flow and the lower the loss occurring in the dead time of fuel injector 1 between two injection cycles. As soon as valve needle 3 is lifted up from the sealing seat in the direction of lift, the fuel having turbulence imparted to it may be injected through injection orifice 7 into the fuel chamber (not shown) of an internal combustion engine.

Figure 2B:
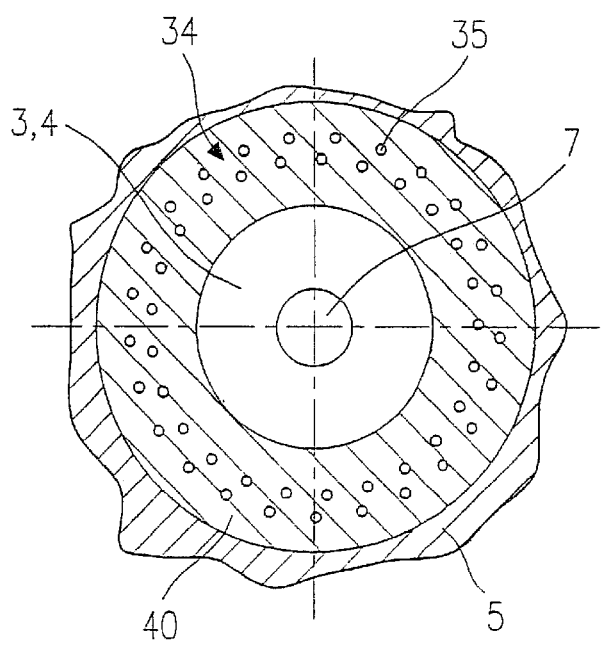
FIG. 2B shows a schematic section through the first embodiment illustrated in FIG. 2A along line IIB—IIB in FIG. 2A.

FIG. 2B shows a schematic sectional view through the first embodiment of a fuel injector 1 according to the present invention, as shown in FIG. 2A, along line IIB—IIB in FIG. 2A. In the embodiment illustrated in FIG. 2B, fuel channels 35 are arranged in two rows 34, with a mutual offset in a circumferential direction. Fuel channels 35 have a very small diameter, e.g., between 100 $\mu$m and 70 $\mu$m. Number n of fuel channels 35 is limited only by the stability requirement. This means that a web, which is at least as wide as the diameter of the fuel channels, remains between two adjacent fuel channels 35. It is advantageous for at least ten fuel channels 35 to be provided, even more advantageous for at least 50 fuel channels to be provided, and yet more advantageous for at least 100 fuel channels to be provided.

Figure 3A:
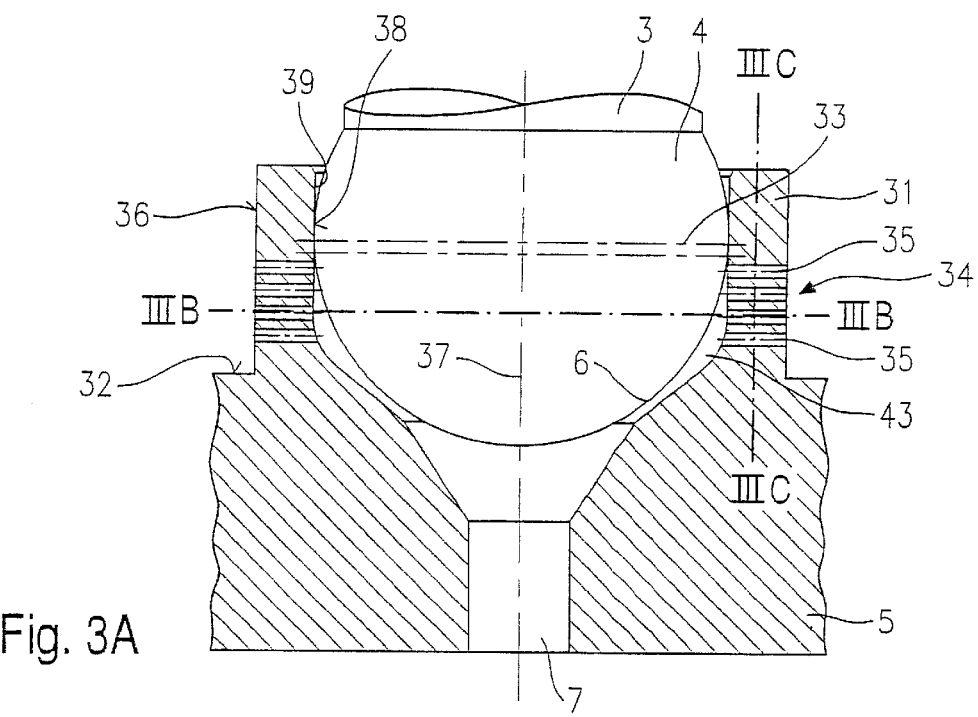
FIG. 3A shows a schematic section through a second embodiment of a fuel injector according to the present invention in area IIA in FIG. 1.

FIG. 3A shows a schematic section through a second embodiment of a fuel injector 1 according to the present invention, likewise in area IIA in FIG. 1.

In the embodiment in FIG. 3A, valve seat carrier 5 has a hollow cylindrical valve needle guide 31, which is either designed in one piece with valve-seat member 5 or is joined to it, e.g., by soldering, welding or similar methods. Valve needle guide 31 has fuel channels 35 which extend from a radially outer side 36 of valve needle guide 31 to a radially inner side of a valve needle guide 31. Fuel channels 35 are arranged in several rows 34. In the present second embodiment, four rows 34 are provided. Valve-closure member 4 is guided in valve needle guide 31. It is in contact with an inside wall 38 of valve needle guide 31 with at least one peripheral guide line 33, valve-closure member 4 being spherical in the present embodiment.

On actuation of fuel injector 1, fuel flows from radially outer side 36 of valve needle guide 31 through fuel channels 35 to radially inner side 39 of valve needle guide 31 and from there through the sealing seat into injection orifice 7. Fuel channels 35 are preferably aligned in parallel with a plane defined by guiding line 33, for example. A swirl chamber 43 is formed between valve-closure member 4, inside wall 38 of valve needle guide 31 and valve-seat surface 6. This swirl chamber may be designed, for example, in the form of a spherical shell to reduce the volume of swirl chamber 43.

On actuation of fuel injector 1, fuel flowing through fuel channels 35 in the direction of injection orifice 7 produces a turbulent flow in swirl chamber 43. A largely homogeneous turbulent flow develops due to the large number of fuel channels 35 which are arranged in at least four rows 34, and this homogeneous turbulent flow is maintained even during the dead time of fuel injector 1 between two injection cycles.

Figure 3B:
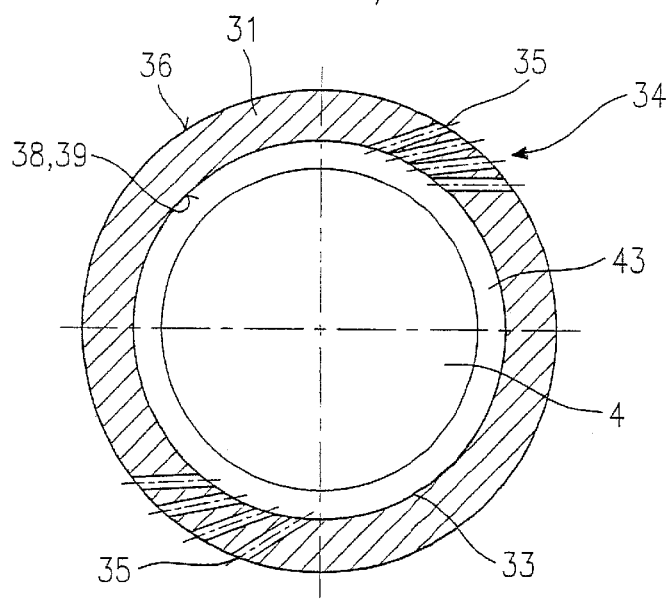
FIG. 3B shows a schematic section through the second embodiment illustrated in FIG. 3A along line IIB—IIB in FIG. 3A.

FIG. 3B shows a schematic section along line IIB—IIB in FIG. 3A through the second embodiment of a fuel injector 1 according to the present invention as illustrated in FIG. 3A.

The sectional plane in FIG. 3A is situated along a row 34 of fuel channels 35. In FIG. 3B, four fuel channels 35 are shown in the first and third quadrants as representative of all fuel channels 35 which are arranged circumferentially in four rows in valve needle guide 31. To produce turbulence, fuel channels 35 are in turn provided with a tangential component relative to a center line 37 of fuel injector 1. Fuel channels 35 open into swirl chamber 43 on the radially inner side 39 of valve needle guide 31. Due to the large number of fuel channels 35, a mostly homogeneous turbulent flow in the circumferential direction is produced also in the present second embodiment.

Figure 3C:
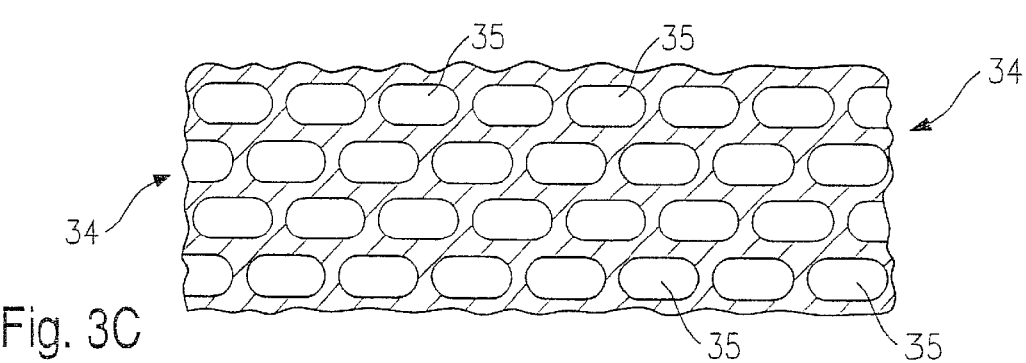
FIG. 3C shows a schematic section along line IIIC—IIIC in FIG. 3A.

FIG. 3C shows a schematic section along line IIIC—IIIC in FIG. 3A. As mentioned above, fuel channels 35 have a tangential component relative to center line 37 of fuel injector 1 to produce turbulence, so the cross section of fuel channel 35 in FIG. 3C appears oval. The orientation of the tangential components of fuel channels 35 is in the same direction in each row 34 relative to the other rows 34.

Figure 4A:
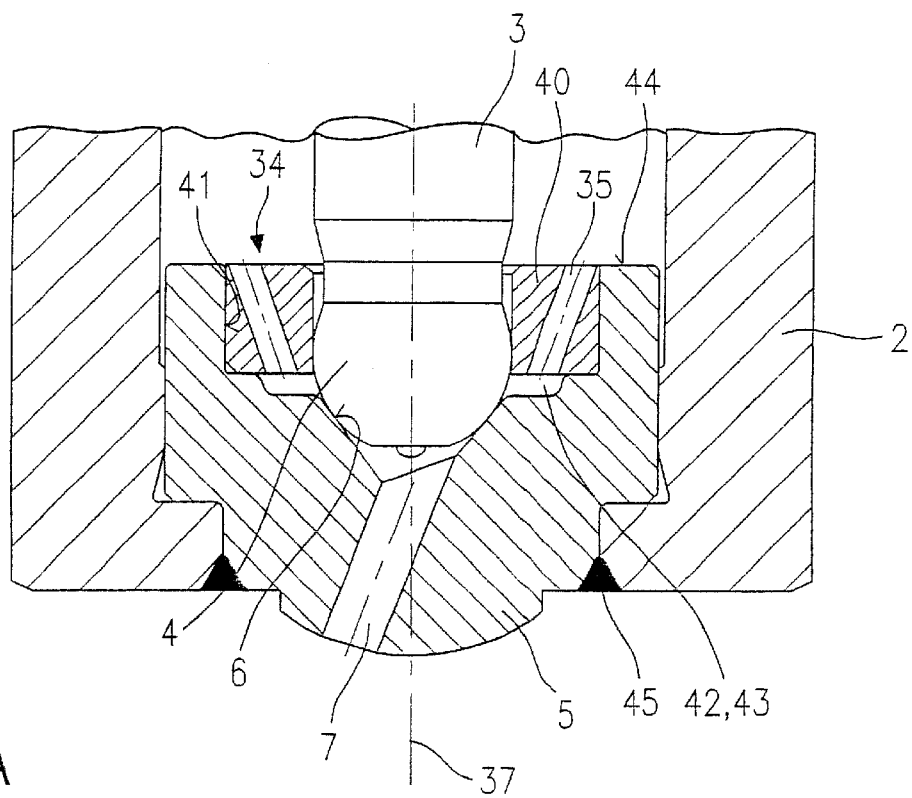
FIG. 4A shows a schematic section through a third embodiment of a fuel injector according to the present invention in area IIA in FIG. 1.

FIG. 4A shows a schematic section through a third embodiment of a fuel injector 1 according to the present invention, likewise in area IIA in FIG. 1.

The present embodiment corresponds in its advantageous components to the first embodiment illustrated in FIG. 2A. In contrast with the latter, annular insert 40 in first recess 41, which is formed in inlet end face 44 of valve-seat member 5, has only one row 34 of fuel channels 35 arranged on the circumference. As in the first embodiment, they are inclined at an angle α to a plane defined by inlet end face 44 of valve-seat member 5. Fuel channels 35 open into swirl chamber 43, which is formed by second recess 42 in valve-seat member 5. In contrast with the first embodiment, fuel channels 35 have a larger diameter to take into account the reduced number of fuel channels 35. The amount of fuel flowing through the channels is the same in each case, so the product of the cross-sectional area and the number of fuel channels 35 is also the same.

Figure 4B:
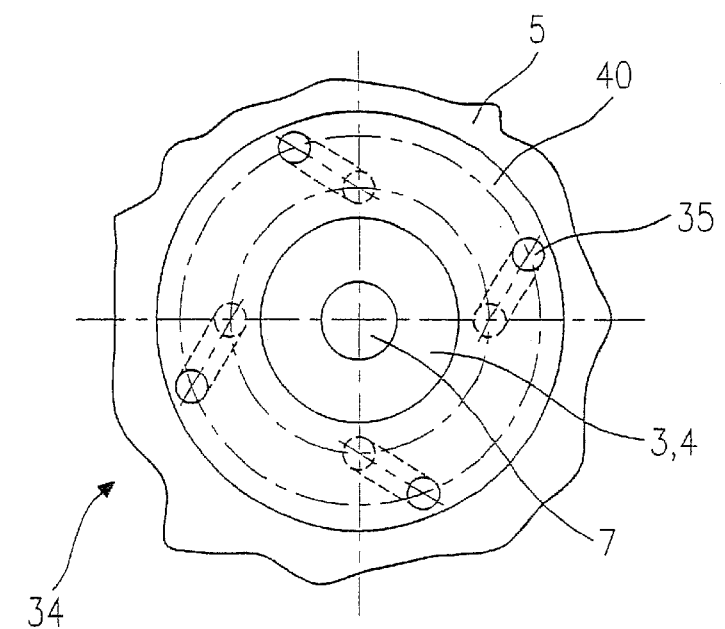
FIG. 4B shows a top view of the third embodiment of the fuel injector according to the present invention as illustrated in FIG. 4A.

FIG. 4B shows a top view of the third embodiment of a fuel injector 1 according to the present invention as illustrated in FIG. 4A. Here again, individual fuel channels 35 are shown in annular insert 40 as representative. They also have a tangential component relative to center line 37 of the fuel injector to produce a turbulent flow. As indicated in FIG. 4B, fuel channels 35 are inclined at an angle α to the plane defined by inlet end face 44 of valve-seat member 45.

All the embodiments described above have in common the fact that they have a large number n of fuel channels 35. This number n is at least ten but is advantageously much larger, amounting to 50 or even 100 or more, for example. The large number n of fuel channels 35 has several advantages: first, due to large number n, no high degree of accuracy is required of the diameters of fuel channels 35. Any inaccuracies in the manufacturing process are averaged out again by large number n, because statistically there will be just as many larger fuel channels 35 as there are smaller fuel channels. It is sufficient if a statistical average approaches the desired diameter.

Second, the turbulent flow becomes increasingly more homogeneous due to an increase in the number n of fuel channels 35, whereas local accumulations of fuel, also known as strands, develop when there are a few fuel channels 35, but this should be avoided in particular in direct injection of fuel into the combustion chamber of an internal combustion engine having compression of a mixture and spark ignition. This is also promoted in particular by a large volume of swirl chamber 43 because the fuel present in swirl chamber 43 comes to a standstill during the dead time of injection valve 1 between two injection cycles, and rotation is induced again with the next injection cycle. Therefore, too much fuel is injected at the beginning of the injection cycle, but less fuel or even too little fuel is injected thereafter. This is prevented by a small volume of the swirl chamber according to the present invention and by the large number n of fuel channels 35.

The present invention is not limited to the embodiments presented here and is also applicable, for example, to fuel injectors 1 having piezoelectric or magnetostrictive actuators 10 and any desired arrangements of fuel channels 35 in rows 34.

What is claimed is:

1. A fuel injector comprising:
    a valve-seat member on which is formed a valve-seat surface;
    a valve needle including on an injection-side thereof a valve closure member that forms a sealing seat with the valve seat surface;
    an actuator for actuating the valve needle; and
    an annular insert that is one of connected to the valve-seat member and designed in one piece, the annular insert including fuel channels that open into a swirl chamber, wherein the number of fuel channels is such that a turbulent flow produced in the swirl chamber is homogeneous in a circumferential direction;
    wherein the fuel channels are situated in circumferential rows in the annular insert.

2. The fuel injector according to claim 1, wherein the annular insert is insertable into a first annular recess of the valve-seat member.

3. The fuel injector according to claim 2, wherein the first annular recess is formed in an inlet end face of the valve-seat member.

4. The fuel injector according to claim 3, wherein the valve needle passes through the annular insert and is guided by the annular insert.

5. The fuel injector according to claim 4, wherein the swirl chamber is formed by a second annular recess of the valve-seat member, the second annular recess having a diameter that is less than that of the first annular recess.

6. The fuel injector according to claim 5, wherein the second annular recess is situated downstream from the first annular recess.

7. The fuel injector according to claim 1, wherein the circumferential rows are arranged concentrically to one another.

8. The fuel injector according to claim 1, wherein the fuel channels in the annular insert are inclined with respect to a center axis of the fuel injector.

* * * * *